Feb. 16, 1960 W. HODGES, JR., ET AL 2,925,286
FIFTH-WHEEL COUPLER FOR TRUCK-TRAILER COMBINATION
Filed May 3, 1957 3 Sheets-Sheet 3
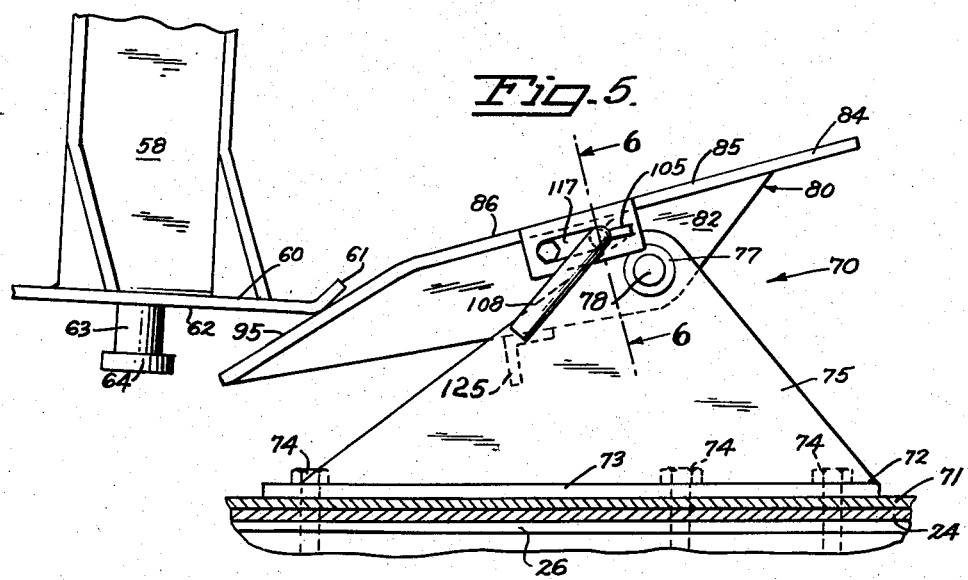
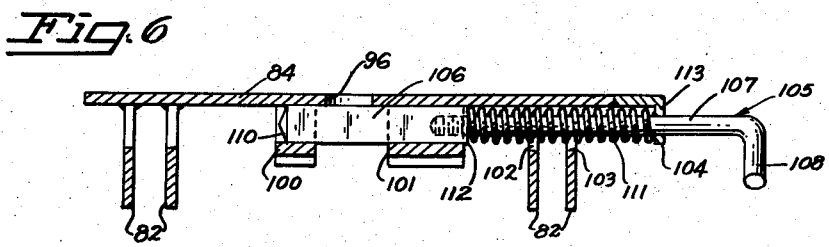
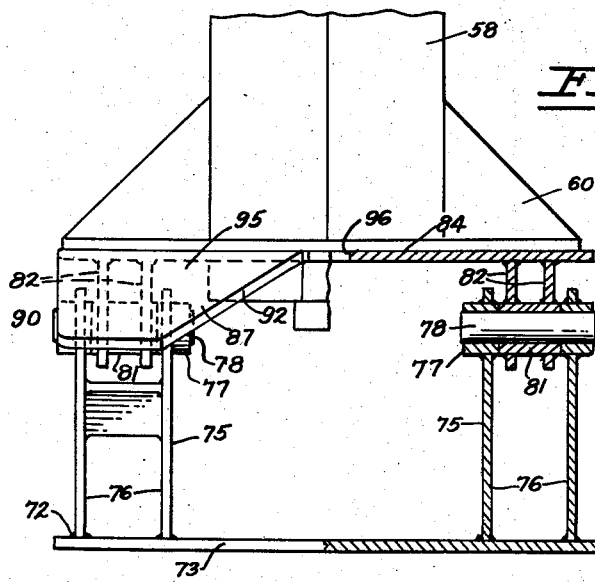
INVENTORS
WETMORE HODGES, JR.
WILLIAM H. MORANDA
BY
ATTORNEY

United States Patent Office 2,925,286
Patented Feb. 16, 1960

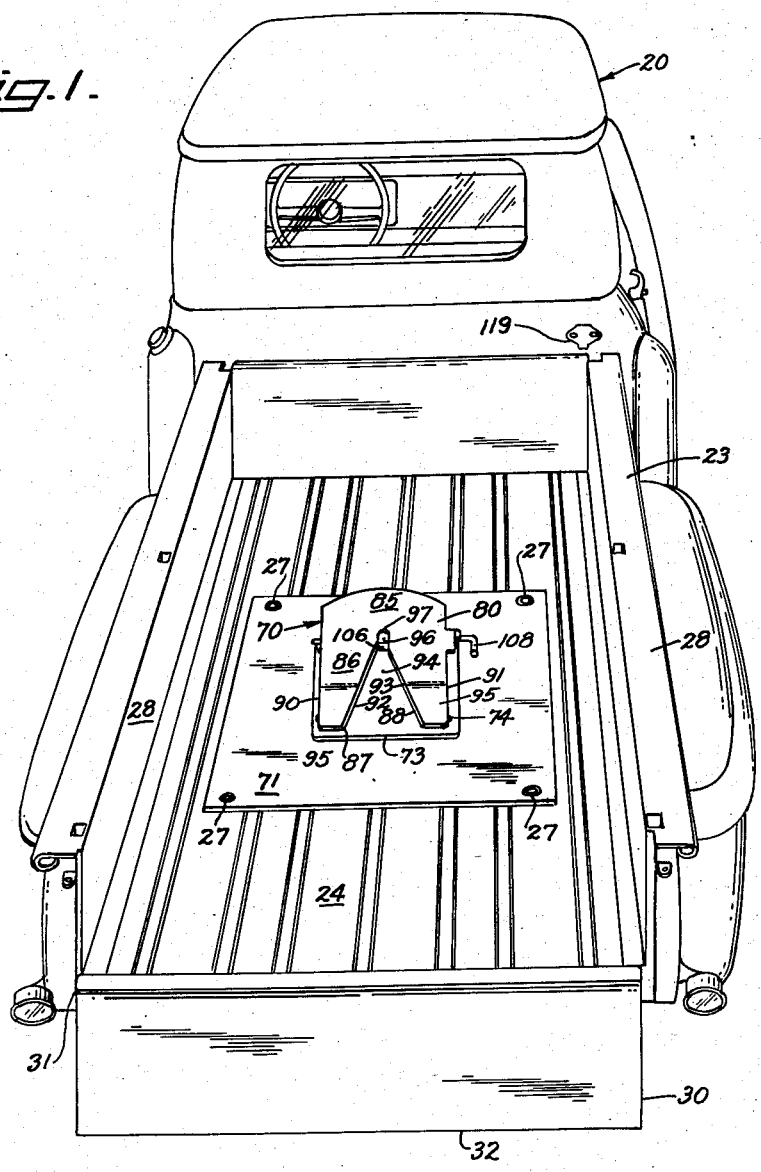

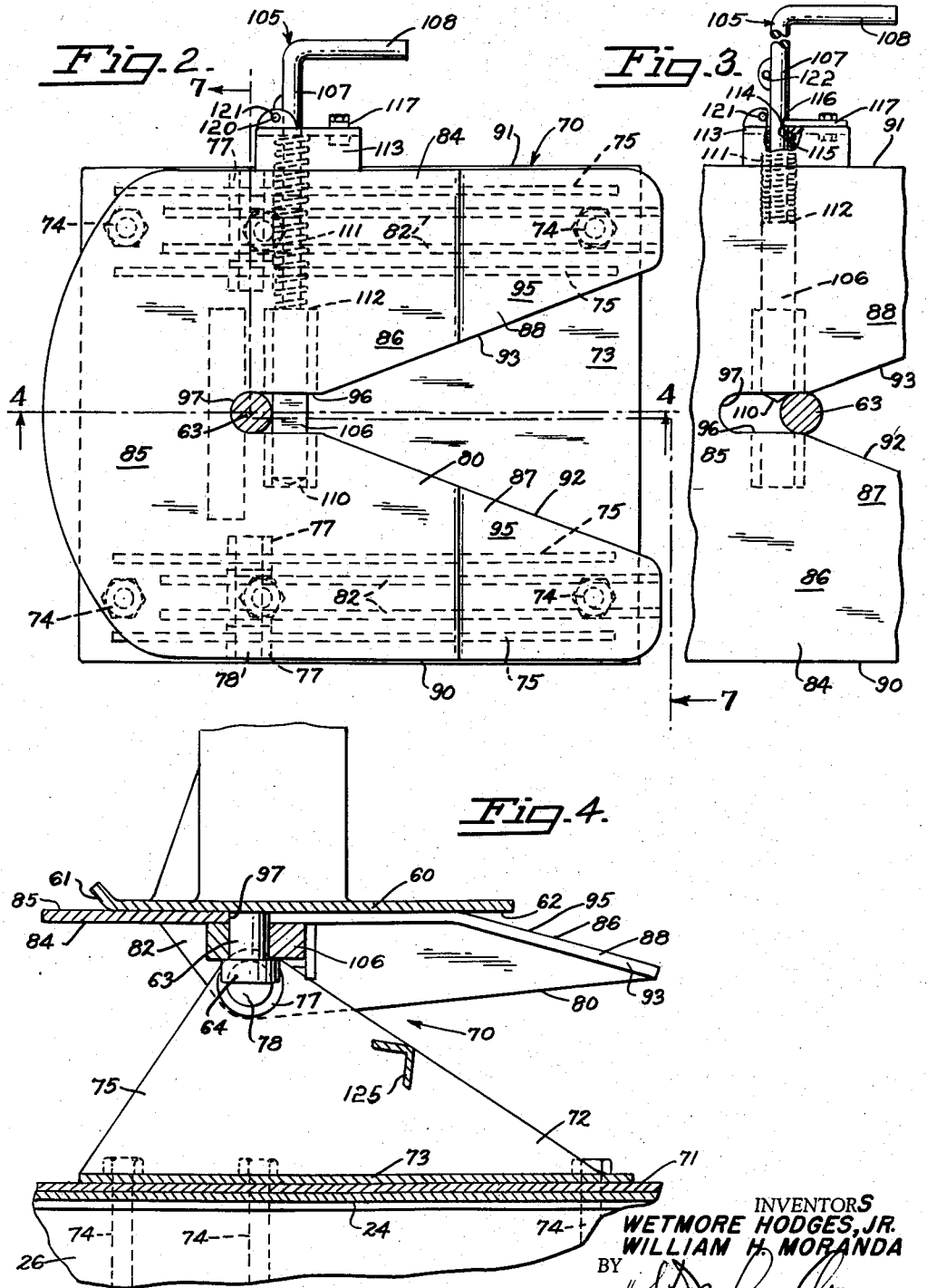

2,925,286

FIFTH-WHEEL COUPLER FOR TRUCK-TRAILER COMBINATION

Wetmore Hodges, Jr., Palo Alto, and William H. Moranda, Mountain View, Calif., assignors to Locomotion Engineering, Inc., Sunnyvale, Calif., a corporation of California Application May 3, 1957, Serial No. 656,850

3 Claims. (Cl. 280—434)

This invention relates to improvements in a fifth-wheel type of coupling for joining a semitrailer to a truck.

The invention solves the problem, which has long confronted the trucking industry, of providing a semitrailer for use with relatively small trucks, such as a light (e.g. ¾-ton) pickup truck. Heretofore, reliance has been made principally upon either four-wheel trailers with the wheels near each end or two-wheel trailers with the wheels near the center, and no semitrailer has been produced that effectively met the demands made by persons using lightweight trucks. The prior-art trailers have been relatively unwieldy and and unstable, have lacked maneuverability and roadability, and have, in many cases, been outright dangerous.

One reason for this failure of the prior art has been the nature of the couplers that have been used. Ordinary trailer hitches are inefficient, slow to couple and uncouple, and often permit the trailer considerable independent movement, which is dangerous. Other couplings heretofore in use have required considerable alteration of the truck and have meant that thereafter the truck could not be used normally as a pickup without complete reconversion. As a result, semitrailers have heretofore been confined to use in heavy trucking.

The present invention provides a new type of semitrailer unit and a coupler that can easily be applied to a pickup truck, as well as to other types of light trucks, to enable their use as a prime mover of the semitrailer. Yet the truck can be reconverted to its normal use in a few minutes.

One object of the invention is to provide a quickly attached and quickly detached coupling for joining a semitrailer to a light truck. In the present invention the units can be coupled or uncoupled in less than two minutes, by an unassisted driver, without his even getting his clothes dirty.

Another object of the invention is to provide a type of fifth-wheel coupling for joining a semitrailer to a truck, which makes it possible to quickly remove the fifth-wheel anchor from the truck to free it from the truck bed, for normal use of the truck, and to quickly re-install it on the truck for use with a semitrailer.

Other objects and advantages of the invention will appear from the following description of a preferred embodiment given in accordance with the statute.

In the drawings:

Fig. 1 is an enlarged perspective view of the rear part of a pickup truck with its tailgate dropped showing a fifth-wheel installation embodying the principles of this invention.

Fig. 2 is a top plan view of the fifth wheel, shown on a further enlarged scale and in fully coupled position, the male coupler kingpin being shown in section and the lockbar being shown in its closed position.

Fig. 3 is a fragmentary view of a portion of Fig. 2 with the lock bar shown in its retracted position and the male coupler kingpin about to engage the cammed inner end of the lock bar, just prior to coupling.

Fig. 4 is a view in side elevation and in section taken along the line 4—4 in Fig. 2 and showing a portion of the base plate and truck bed and an end portion of the semitrailer gooseneck frame.

Fig. 5 is a view in side elevation of the coupler members of Fig. 4 in the position just prior to coupling, the shoe at the bottom of the gooseneck frame engaging the cammed rear end of the fifth wheel.

Fig. 6 is a view in elevation and in section, taken along the line 6—6 in Fig. 5, but showing the locking bar in its closed position, whereas in Fig. 5 it is latched into its open position.

Fig. 7 is a rear elevational view, partly in section, taken along the line 7—7 in Fig. 2.

*The fifth-wheel structure*

Preferably, the fifth wheel 70, or female coupler, is installed in a pickup truck 20 in a manner enabling its ready removal when it is desired to use the truck in its normal manner instead of as the prime mover for a semitrailer. For this purpose it has been found advantageous to provide a relatively permanent flat base plate 71, which may be held by the same four main bolts 27 that hold the body 23 to the frame 26; the bolts that come with the truck are ordinarily removed and replaced by longer ones that accommodate the additional thickness of the plate 71. If desired, a similar plate member (not shown) may be inserted beneath the body 23 to give it further bracing. Once installed, the base plate 71 is normally left in place (although it may be removed if desired), since its upper surface is only a fraction of an inch higher than the bed 24. The remainder of the fifth wheel 70 is made separable from the base plate 71.

The fifth-wheel assembly 70 includes a base member 72 with a bottom plate 73, and the base member 72 is removably secured to the base plate 71 by bolts 74 (see Fig. 6) which preferably extend through the bed 24. The bottom plate 73 of the base member 72 has a much smaller area than the plate 71 and is readily removed and reinstalled when the plate 71 is in place. The base member 72 also comprises a pair of upright supporting members 75, each of which may be made of two sheets 76 of steel plate spaced apart from each other and provided with in-line cylindrical journals 77 that support trunnions 78.

The female coupler or fifth wheel also includes a table assembly 80 rotatably mounted on the trunnions 78, by means of cylindrical journals 81 near the lower extremity of depending legs 82. The location of the pivot line, i.e., the trunnion 78, is important for a proper distribution of the load. Preferably, the trunnions 78 lie forward of the rear axle 83 and preferably lie about 3 inches forward of it, so that the centers of gravity are still properly aligned when the truck 20 is on a slope. This assures proper placing of the gooseneck-transmitted portion of the load of the semitrailer 40 on the rear wheels 22 of the truck 20, while most of the load is carried by the semitrailer's own wheels, 42, 43.

The table assembly 80 includes a table 84 with a main forward portion 85 almost entirely forward of the trunnions 78 and a rear portion 86 lying entirely behind the trunnions 78 having a pair of rearwardly-extending, diverging jaws 87, 88. The outer side edges 90, 91 of the jaws are parallel, but their inner edges 92, 93 diverge to define a notch 94 between them. It will be noted that the rearward or outer end 95 of the rear portion 86 is inclined downwardly with respect to the remainder of the table 84. The portion 95 is important, for it serves as an inclined plane to guide the shoe 60 up onto the table 84. At the same time, the king-pin 63 is guided by the sides 92, 93 of the notch 94 into a longitudinal central slot 96 which has parallel sides and a semicircular forward end wall 97 lying barely rear of the trunnions 78 and still forward of said rear axle 83.

Beneath the table 84 and preferably secured to it (see Fig. 6) are a group of guides 100, 101, 102, 103, 104 defining a lateral passageway in which a lock bar 105 slides. The lock bar 105 itself consists in a strong, rectangular, iron bar 106 with a cylindrical member 107 threaded into it and provided with a handle 108 at its outward end. The inner end 110 of the bar 106 is cammed for a reason which will presently appear. A spring 111 is mounted around the cylindrical portion 107 between the other end 112 of the rectangular bar 106 and a bracket 113 to urge the lock bar 105 to a normally locked position.

However, the cylindrical portion 107 of the lock bar 105 is provided with a latching notch 114, and, as shown in Fig. 3, the inner portion 115 of the notch 114 preferably slopes, while the outer end 116 is vertical. A latch member 117 is pivotally mounted on the bracket 113; so when the handle 108 is pulled out, the latch 117 can be engaged in the notch 114 to hold the lock bar 105 out. As shown in Fig. 3, the cammed inner end 110 of the lock bar 105 will then barely project into the slot 96. The reason for this will be explained in the operation section. It is an important feature, because it enables the coupling to be self-locking.

*The coupling operation*

Before the truck 20 and semitrailer are coupled together, the semitrailer is supported on its landing gear legs so that the bed is substantially level. In normal use, the trailer is usually loaded in that position and coupled to the truck 20 when loaded.

The truck 20 is backed up to the trailer with the tailgate 30 dropped, as shown in Fig. 1, and the table 84 tilted as shown in Fig. 5 to insure engagement by the shoe 60, which will lie directly above the level of the truck bed 24. A stop 125 limits the tilt of the table 84. The driver backs the truck 20 until the inclined portion 61 of the shoe 60 engages or is about to engage the inclined portion 95 of the table 84, the kingpin 63 approaching the notch 94. Then the driver normally stops the truck 20, gets out, and attaches a braking cable from the truck trailer into a socket 119 of the truck. It is important for the brakes of the semitrailer to be kept on during coupling. Otherwise, when the table 84 pushes against the shoe 60, it may move the semitrailer instead of coupling to it, which would be dangerous.

With the brake cables attached, the driver notes whether he is in proper alignment and gets back into the truck 20. As he continues backing, the shoe 60 rides up on the inclined table portion 95 of the tilted table 84. This is very important, because pickup trucks 20 usually have springs that will give about three inches, and therefore the tilting of the table 80 and the inclined outer end 95 of the jaws are necessary to achieve the proper level, which depends upon the loading of the truck 20 and the loading of the trailer. As the shoe 60 rides up on the jaws, it reaches the normally level portion and moves forward along it; then when the shoe end 61 passes beyond the trunnions 78 it tilts the table 84 to its normal, level position, at the same time guiding the kingpin 63 toward the slot 96.

Upon entry of the slot 96, the kingpin 63 engages the cammed inner end 110 of the lock bar 105 and, since it cannot get into the slot 96 without moving the lock bar 105 outwardly, it forces the lock bar 105 outwardly against the pressure of the spring 111. Outward movement of the notch 114 causes the latch 117 to drop out; so when the kingpin 63 engages against the semi-circular forward end wall 97, the spring 111 snaps the lock bar 105 back across the slot 96, completing and locking the coupling. The kingpin 63 is then snugly engaged by the wall 97 and bar 105. The driver may then raise the landing gear of the semitrailer into its normal riding position and preferably inserts a locking pin 120 through an opening 121 in the bracket 113 and an opening 122 in the lock bar 105, to hold the bar 105 against any accidental, or even intentional, withdrawal. And he also raises and locks the tailgate 30. Then he can drive the combination away in perfect safety.

When uncoupling, the operator drops the tailgate 30, lowers the trailer landing gear 65, and removes the pin 120. He then pulls the handle 108 out against the pressure of the spring 111 and inserts the latch 117 in the notch 114. Getting back into the truck, he begins to go forward, and as the truck moves forward, the kingpin 63 forces the lock bar 105 out, permitting it to snap back when the kingpin 63 has been withdrawn from the slot 96. When the shoe 60 leaves the table 84, the operator stops and detaches the brake cables from the socket 119. He may then get back into his truck and drive away.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A fifth-wheel type of coupler for a truck and semitrailer combination including in combination: a male coupler having a plate with a flat lower surface and a kingpin projecting downwardly therefrom; a female coupler base assembly with a pair of upright supporting members; a female coupler comprising a table with depending members pivotally secured to said supporting members along a horizontal lateral line, said table having a pair of rearwardly-extending diverging jaws, each with a rear, downwardly-inclined portion, said jaws defining a notch extending forward from the rear edge of said plate and leading into a longitudinal slot with an end wall against which said kingpin fits; a coupling lock bar mounted for lateral sliding movement below said table and adapted to extend across said slot rearward from said end wall when in closed position, and adapted for retraction therefrom, the inner end of said lock bar being cammed, said lock bar having a latching notch; spring means normally urging said lock bar to its closed position; and a pivotally-mounted latch adapted to engage said latching notch and hold said lock bar with its cammed inner end barely extending into said slot.

2. A fifth-wheel type of coupler for a truck and semitrailer combination, including in combination: a male coupler having a plate with a flat lower surface, an inclined forward end, a kingpin projecting downwardly therefrom, said kingpin having an enlarged lower end; a female coupler base plate adapted to be secured to a truck frame; a base assembly having a base member smaller in area than said base plate and secured thereto, and a pair of upright supporting members; a female coupler comprising a table with depending side members secured to said supporting members along a horizontal lateral pivot, said table having a main forward portion mostly forward of said trunnions and a rear portion rear of said trunnions and comprising a pair of rearwardly-extending diverging jaws, each with a rear, downwardly-inclined portion, said jaws defining a notch extending forward from the rear edge of said plate, the sides of said notch converging toward the front and leading into a longitudinal central slot with a forward end wall barely rear of said trunnions, said table also having lock bar guides; a coupling lock bar mounted in said lock-bar guides for lateral sliding movement and adapted to extend across said slot just below said table rearward from said forward end wall when in closed position, and adapted for retraction therefrom, the inner end of said lock bar being cammed, said lock bar having a handle at its outer end and a latching notch; spring means normally urging said lock bar to its closed position; and a latch pivotally mounted to said table and adapted to engage said latching notch and hold said lock bar with its cammed inner end barely extending into said slot, whereby said plate is adapted to engage said inclined jaw portions and ride up on said table while said kingpin is guided by said notch against said cammed inner end, moving said lock bar laterally outwardly so as to disengage said latch from said latching notch, so that when said kingpin comes against said forward end wall, said spring means snaps said lock bar behind said kingpin.

3. A fifth wheel type of coupler for a truck and semi-trailer combination wherein the truck is a standard automotive truck having a wheel-supported frame with a rear axle and a load-carrying bed at the rear thereof, including in combination; a male coupler for said semi-trailer having a flat plate with a kingpin projecting downwardly therefrom, said kingpin having an enlarged lower end; a base plate adapted to be secured to said frame; a coupler base assembly having a base member smaller in area than said base plate and secured thereto, and a pair of upright supporting members; a female coupler comprising a table with depending side members pivotally secured to said supporting members by horizontal lateral trunnions, said table having a main forward portion mostly forward of said trunnions and a rear portion rear of said trunnions and comprising a pair of rearwardly-extending diverging jaws, each with a rear, downwardly-inclined portion, said jaws defining a notch extending forward from the rear edge of said plate, the sides of said notch converging toward the front and leading into a longitudinal central slot with parallel sides and a semicircular forward end wall barely rear of said trunnions, said table also having lock bar guides; a coupling lock bar mounted in said lock bar guides for lateral sliding movement and adapted to extend across said slot just below said table rearward from said forward end wall a distance equal to the width of said slot, when in closed position, and adapted for retraction therefrom, the inner end of said lock bar being cammed, said lock bar having a handle at its outer end and a latching notch which, when said lock bar is retracted from said slot, lies adjacent an edge of said table; spring means normally urging said lock bar to its closed position; and a latch pivotally mounted to said table and adapted to engage said latching notch and hold said lock bar with its cammed inner end barely extending into said slot, whereby said plate is adapted to engage said inclined jaw portions and ride up on said table while said kingpin is adapted to be guided by said notch into said slot and, upon striking said cammed inner end of said lock bar, to move said lock bar laterally outwardly so as to disengage said latch from said latching notch, so that on movement of said kingpin in against said forward end wall, said spring means snaps said lock bar behind said kingpin, making said coupling.

References Cited in the file of this patent

UNITED STATES PATENTS

| | | |
|---|---|---|
| 1,799,846 | Greer | Apr. 7, 1931 |
| 1,853,701 | Schlaegel | Apr. 12, 1932 |
| 1,951,258 | Retzlaff et al. | Mar. 13, 1934 |
| 2,219,415 | Fontaine | Oct. 29, 1940 |
| 2,425,521 | Ellberg | Aug. 12, 1947 |
| 2,736,574 | Braunberger | Feb. 28, 1956 |

FOREIGN PATENTS

| | | |
|---|---|---|
| 538,961 | Germany | Dec. 3, 1931 |